United States Patent
Sangapu et al.

(10) Patent No.: US 8,082,392 B2
(45) Date of Patent: Dec. 20, 2011

(54) MANAGING STORAGE ARRAY OPERATIONS THAT CAUSE LOSS OF ACCESS TO MIRRORED DATA

(75) Inventors: Satish K. Sangapu, Wichita, KS (US); Derek J. Bendixen, Thornton, CO (US)

(73) Assignee: LSI Corporation, Milpitas, CA (US)

( * ) Notice: Subject to any disclaimer, the term of this patent is extended or adjusted under 35 U.S.C. 154(b) by 275 days.

(21) Appl. No.: 12/431,016

(22) Filed: Apr. 28, 2009

(65) Prior Publication Data
US 2010/0274967 A1   Oct. 28, 2010

(51) Int. Cl.
*G06F 12/00* (2006.01)

(52) U.S. Cl. ........................................................ 711/114

(58) Field of Classification Search ........................ None
See application file for complete search history.

(56) References Cited

U.S. PATENT DOCUMENTS

| | | | | |
|---|---|---|---|---|
| 6,154,854 A | * | 11/2000 | Stallmo | 714/6.12 |
| 7,547,525 B2 | * | 6/2009 | Goodwin, Jr. | 435/29 |
| 2009/0006428 A1 | * | 1/2009 | Kahler et al. | 707/100 |

* cited by examiner

*Primary Examiner* — Hiep Nguyen
(74) *Attorney, Agent, or Firm* — Daniel J. Santos; Lawrence D. Maxwell

(57) ABSTRACT

Storage array operations, such as code downloads and other operations of the type that cause loss of access to portions of the storage array, are managed in a manner that preserves access to other portions of the storage array so that other storage array operations, such as data synchronization, can continue.

19 Claims, 5 Drawing Sheets

MANAGING STORAGE ARRAY OPERATIONS THAT CAUSE LOSS OF ACCESS TO MIRRORED DATA

TECHNICAL FIELD OF THE INVENTION

The invention relates generally to data storage arrays and, more specifically, to managing storage array operations that cause loss of access to mirrored data.

BACKGROUND OF THE INVENTION

A storage array or disk array is a data storage device that includes multiple disk drives or similar persistent storage devices. A storage array can allow a host (computer) system to store and retrieve large amounts of data in an efficient manner. A storage array also can provide redundancy to promote reliability, as in the case of a Redundant Array of Inexpensive Disks (RAID) storage array or other mirrored storage array.

In a mirrored storage array, some or all of the data that is stored on one disk drive is similarly stored on one or more other disk drives. That is, some or all of the contents of a disk drive mirror some or all of the contents of some or all of the other disk drives of the array. The set of redundantly stored data is commonly referred to as a mirror. When a host system writes data to the storage array, the storage array controller copies the data onto each disk drive in the mirror, either by simultaneously writing the data to each disk drive in the mirror or by writing the data to one or more disk drives in the mirror and then copying the data from those disk drives to other disk drives in the mirror. The process of copying data from one disk drive to another or otherwise ensuring that each disk drive in the mirror contains the same data is commonly referred to as mirroring.

To ensure that the data does not differ among disk drives in the mirror, an operation commonly referred to as synchronization can be performed. Synchronization is typically performed periodically or at some time after any event that could potentially result in some of the data differing from one disk drive in the mirror to another. For example, synchronization can be performed after a disk drive is removed and replaced, to ensure that the contents of the disk drive exactly mirror those of the other disk drives in the array. Synchronization cannot be performed during certain storage array operations that cause loss of access to disk drives in the mirror. For example, synchronization generally cannot be performed while the storage array is being updated with new software or firmware. In some instances, downloading such new software involves storing the software (or firmware) on all of the disk drives in the storage array essentially simultaneously and then rebooting them. Until the disk drives are fully rebooted, the host system cannot access the storage array, and the system controller cannot perform synchronization or other operations requiring availability of the disk drives.

SUMMARY

The invention relates to managing storage array operations, such as software downloads and other operations of the types that cause loss of read and write access to storage devices (e.g., disk drives) containing mirrored data, in a manner that promotes maximal availability of the mirrored data during the operations.

The operation, such as a software download, is successively initiated on each of a number of groups of one or more storage devices in the array. During the operation on a group of storage devices, two groups of storage devices other than the group of storage devices being operated upon can be synchronized. The operation is not initiated on a next group of storage devices until the operation on a previous group has completed and any synchronization between other groups has completed.

In exemplary embodiments, disk drives are grouped, and code downloads are staggered or successively performed from one group of one or more disk drives to the next group of one or more drives. While a group of disk drives is undergoing the download, synchronization can be performed between any other groups of disk drives that are not undergoing the download.

DETAILED DESCRIPTION OF AN ILLUSTRATIVE EMBODIMENT

Figure 1:
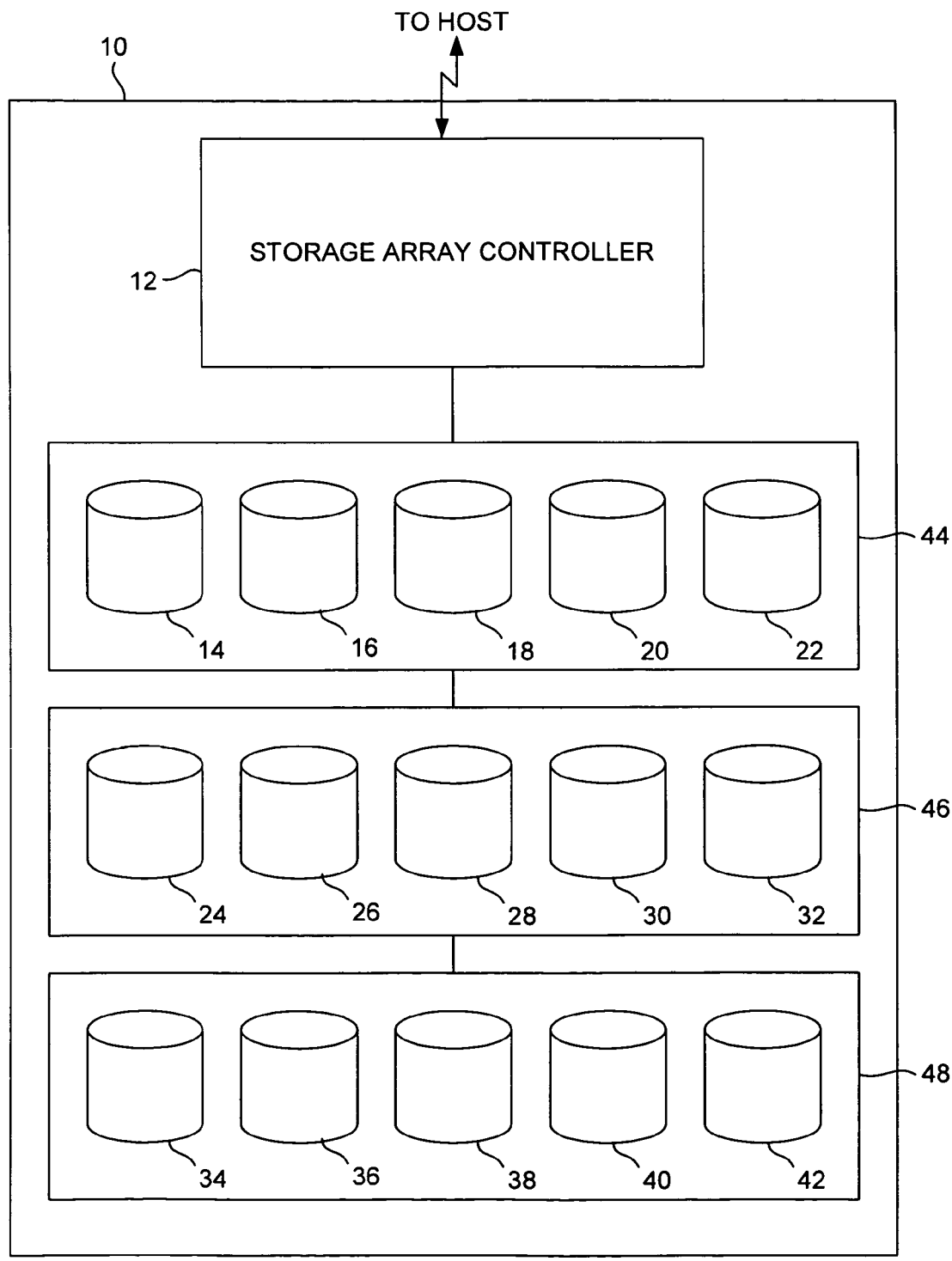
FIG. 1 is a block diagram of a storage array in accordance with an exemplary embodiment of the invention.

As illustrated in FIG. 1, in an illustrative or exemplary embodiment of the invention, a storage array 10 includes a storage array controller 12. Although a storage array can have any number and type of storage devices, in the exemplary embodiment storage array 10 is described herein for purposes of illustration as having 15 disk drives 14, 16, 18, 20, 22, 24, 26, 28, 30, 32, 34, 36, 38, 40 and 42. Also, although in the exemplary embodiment the storage devices are disk drives, in other embodiments the storage devices can comprise any other type of persistent data storage device. In addition, although such storage devices can be organized or arranged in any suitable manner, for purposes of illustration in the exemplary embodiment, disk drives 14, 16, 18, 20 and 22 are included in a first tray 44; disk drives 24, 26, 28, 30 and 32 are included in a second tray 46; and disk drives 34, 36, 38, 40 and 42 are included in a third tray 48. Trays 44, 46 and 48 supply power, ground and similar signals to their respective disk drives and otherwise provide electrical and mechanical connections for their respective disk drives. As known in the art, it is desirable to organize the disk drives of a storage array into such multiple trays or similar units to aid maintenance and diagnostics and to support redundancy measures.

Storage array controller 12 controls high-level operation of storage array 10, receiving and acting upon requests from a host (computer) system (not shown for purposes of clarity) to write data to and read data from storage array 10. As storage array 10 acts upon such write and read requests in the conventional manner well understood in the art, such processes are not described in this patent specification ("herein"). It can be noted that to write data, storage array controller 12 receives the data from the host, selects one or more of disk drives 14-42, and causes the selected ones of disk drives 14-42 to write, i.e., record, the data on its persistent storage medium (e.g., magnetic disk). Similarly, to read data, storage array controller 12 selects one or more of disk drives 14-42, causes the selected ones of disk drives 14-42 to read, i.e., retrieve, data from its storage medium, and transmits the retrieved data to the host. In addition to controlling such writing and reading of data, storage array controller 12 controls the mirroring of data. Some or all of the data stored on disk drives 14-42 can be mirrored data. That is, data that is recorded on one of disk drives 14-42 is also recorded on another one of disk drives 14-42. As storage array 10 can perform data mirroring in the conventional manner well understood in the art, mirroring is not, by itself, described herein. Storage array 10 can also perform any other conventional function commonly performed by such storage arrays, such as functions relating to storage array maintenance or upgrade.

Figure 2:
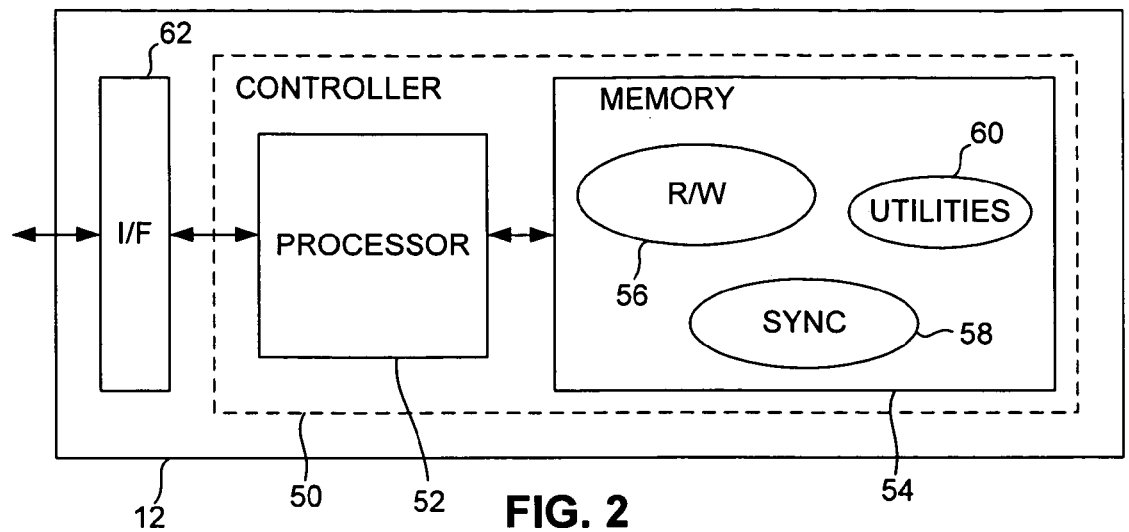
FIG. 2 is a block diagram of an exemplary storage array controller of the storage array of FIG. 1.

Although storage array controller 12 can have any suitable structure or architecture that enables it to control or otherwise effect the functions described herein, an exemplary structure in which the functions are performed at least in part under the control of software elements is illustrated in FIG. 2. The combination of such software or firmware elements and the hardware elements with which they interact constitutes a programmed processor system 50 that is programmed or configured to effect the functions or methods of operation described herein. Programmed processor system 50 includes at least a processor 52 and memory 54. Programmed processor system 50 can effect the writing of data to and reading of data from disk drives 14-42 under control of a read/write software element 56. Likewise, programmed processor system 50 can effect the synchronization of data between two or more of disk drives 14-42 under control of a synchronization software element 58. In addition, programmed processor system 50 can effect maintenance, upgrade and similar storage array operations under control of a utility software element 60. In addition to any conventional maintenance and upgrade operations, utility software element 60 can reflect the downloading methods described below with regard to FIG. 4. Storage array controller 12 can further include various suitable interfaces 62 that aid interfacing it with disk drives 14-42 and a host system.

Although not shown for purposes of clarity, storage array controller 12 can include any other suitable software or hardware elements of the types commonly included in storage array control systems. Also, although the above-described software elements are depicted for purposes of illustration as stored in or residing in memory 54, as persons skilled in the art to which the invention relates understand, such software elements may not reside simultaneously or in their entireties in memory 54 or other such storage medium. Rather, in accordance with conventional computing principles, such software elements can be retrieved into memory 54 in portions (e.g., instructions, code segments, files, libraries, etc.) on an as-needed basis from one or more suitable sources, such as one or more of disk drives 14-42 or other disk drives or storage devices, via a network connection from a remote device, etc. It should be noted that the combination of one or more of above-described software elements or portions thereof and memory 54 or other computer-readable medium on which they are recorded constitutes a "computer program product" as that term is used in the patent lexicon.

Figure 3:
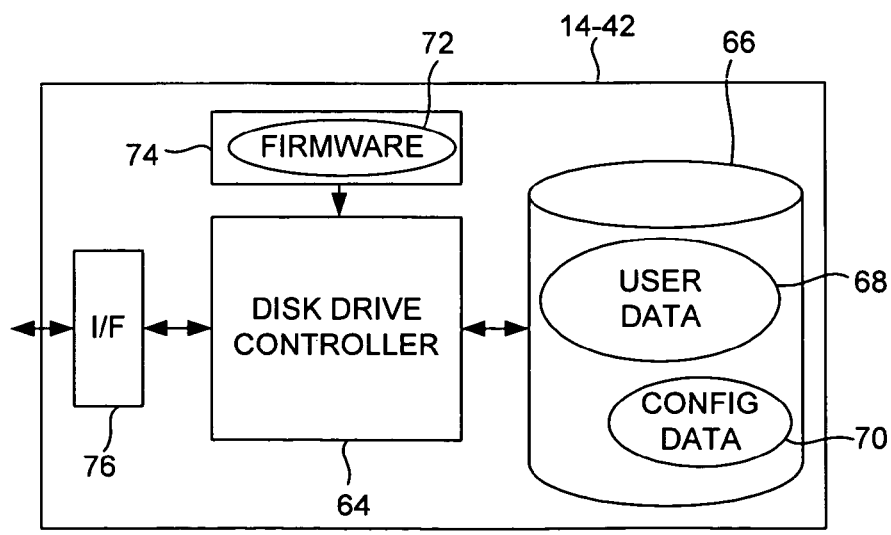
FIG. 3 is a block diagram of an exemplary disk drive of the storage array of FIG. 1.

Each of disk drives 14-42 can have the exemplary structure shown in FIG. 3. A disk drive controller 64 controls the read, write and other operations in the conventional manner to read data from and write data to the magnetic disk or other storage medium 66. The data can include user data 68, which is the data that the host reads and writes to and from storage array 10 in the normal course of operation (i.e., rather than for maintenance, upgrade or similar purposes), and configuration data 70, which is data relating to the disk drive configurations, volume mapping, and other system information of the type conventionally maintained by storage arrays. Although not shown for purposes of clarity, still other types of data may be stored on storage medium 66.

Storage array 10 cannot operate optimally without access to configuration data 70. For example, if storage array 10 is powered down, restoring storage array 10 to the state in which it powered down requires access to configuration data 70 upon powering up. Accordingly, in storage array 10 of the exemplary embodiment, as in some conventional storage arrays, configuration data 70 is mirrored among disk drives 14-42. That is, but for the undesirable effect of an event that causes loss of data synchronization between two or more of disk drives 14-42, the same configuration data 70 that is stored on one of disk drives 14-42 is stored on every other one of disk drives 14-42.

Disk drive controller 64 operates at least in part under the control of firmware 72 stored in a suitable memory 74 such as an EPROM (electrically programmable read-only memory). Each of disk drives 14-42 can further include various suitable interfaces 76 that aid interfacing it with storage array controller 12, others of disk drives 14-42, or other elements of storage array 10.

Figure 4:
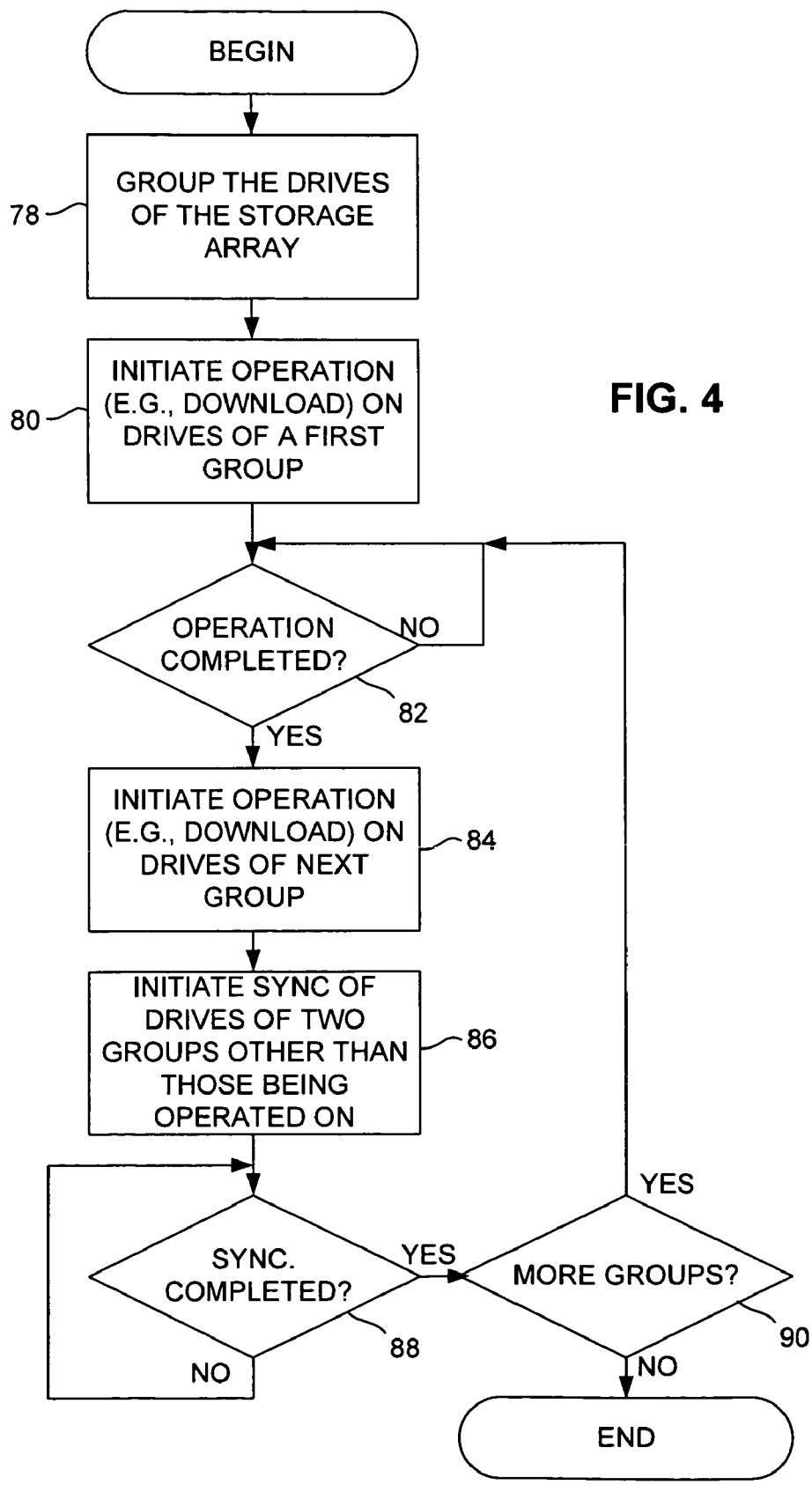
FIG. 4 is a flow diagram, illustrating a method of operation of the storage array of FIG. 1 in accordance with the exemplary embodiment.

As illustrated in FIG. 4, in an exemplary method of operation storage array 10 can manage a storage array operation, such as a download of firmware 72 (FIG. 3) or other operation of a type that causes loss of read and write access to configuration data 70 (FIG. 3) or other mirrored data, in a manner that promotes availability of the mirrored data during the download or other such operation. Storage array 10 can operate as described herein with regard to FIG. 4 in any suitable manner. For example, the method or similar methods can be reflected at least in part by program code, data structures, data or similar aspects of utility software element 60 (FIG. 2). In view of the descriptions herein, persons skilled in the art will readily be capable of providing a suitable utility software element 60 or otherwise be capable of programming or configuring software elements, hardware elements or combinations thereof to cause storage array 10 to operate as described herein.

The method can begin at any suitable time, such as upon receipt of an indication (e.g., from the host) that a firmware download is to begin. As indicated by block 78, in the exemplary embodiment disk drives 14-42 are first grouped. That is, one or more of disk drives 14-42 is included in a first group, one or more others of disk drives 14-42 are included in a second group, etc. The purpose of grouping disk drives 14-42 is described below. Although in the exemplary embodiment the firmware download operation is to be performed upon all drives 14-42 containing the mirrored data, in an instance in which the operation is to be performed upon fewer disk drives, only those disk drives that are to have the operation performed upon them need be grouped.

As indicated by block 80, a firmware download operation is initiated on a first group of disk drives 14-42. A firmware download involves storage array controller 12 receiving new or updated firmware 72 from a source such as the host system and routing the firmware to the appropriate ones of disk drives 14-42, which in turn stores firmware 72 in memory 74. After firmware 72 has been downloaded to one of disk drives 14-42 in this manner, storage array controller 12 causes that one of disk drives 14-42 to reboot. Until the download-and-reboot operation has completed, storage array controller 12 has no access to that one of disk drives 14-42, i.e., storage array controller 12 cannot read data from or write data to that one of disk drives 14-42. In some prior storage arrays, the storage array controller would route the new or updated firmware to all disk drives in the array essentially simultaneously and cause them to reboot essentially simultaneously. As a result, storage array controller 12 would have no access to the configuration data and thus be unable to read and write user data properly until the disk drives had fully booted up. The same problem of rendering mirrored data inaccessible or less accessible to the system controller, host, or other system or device that requires access to such mirrored data would occur in any other instance in which a disk array operation is performed that renders one more drives or other storage devices inaccessible. As described below, in the exemplary method the operation (e.g., a firmware download) is performed upon successive groups of disk drives 14-42, such that while one group is having the operation performed upon it, two or more other groups can undergo synchronization of the mirrored data.

Once the firmware download or other operation is completed, e.g., firmware 72 has been downloaded to a group of disk drives 14-42 and the group has been rebooted, the same operation can be initiated on another group of disk drives 14-42. As indicated by blocks 82 and 84, the method does not proceed with initiating the operation on another group of disk drives 14-42 until the operation has completed on the previous group. Once the operation has been initiated on another group of disk drives 14-42, a synchronization of two other groups of disk drives 14-42 can be initiated (i.e., other than the group undergoing the operation), as indicated by block 86. With regard to block 88, the method does not proceed with initiating the operation on still another group of disk drives 14-42 until both the operation has completed on the previous group and the synchronization has completed. As indicated by block 90, when there are no further groups on which the operation is to be performed, the method ends.

The sequence or succession of groups upon which the operation (e.g., a firmware download) is performed can be determined in any suitable manner and at any suitable time. For example, the groups and the order in which they are operated upon can be determined in response to receipt of an indication (e.g., from the host system) that a firmware download is to begin. Alternatively, the groups can be pre-determined, i.e., determined prior to any indication that a firmware download is to begin.

Figure 5:
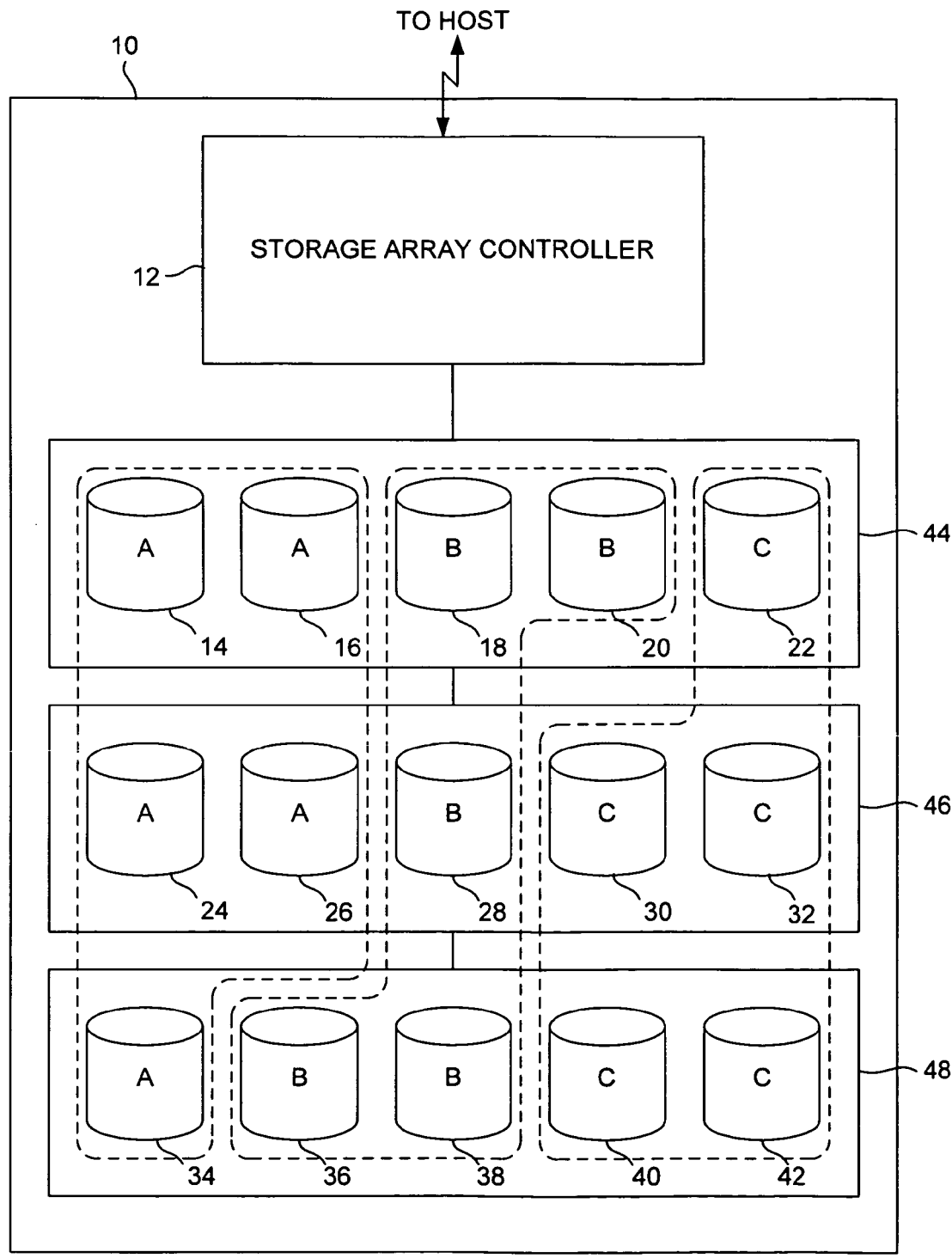
FIG. 5 is similar to FIG. 1, illustrating the grouping of storage devices in accordance with the exemplary method of operation.

As illustrated in FIG. 5, disk drives 14-42 can be grouped so that each group includes disk drives from more than one tray. Including drives from more than one tray in each group helps maximize the likelihood that, in the event of a loss of one or more trays (e.g., power loss, malfunction, removal of tray, etc.), system controller 12 will be able to retrieve configuration data 70 or other data needed for operation from one or more remaining trays. For example, there can be three groups, referred to as Group A, Group B and Group C in the exemplary embodiment, each of which includes drives from at least two of trays 44, 46 and 48. A grouping that is still more resistant to the adverse effects of tray loss involves including at least one drive from each of trays 44, 46 and 48 in each group. Still further resistance to the adverse effects of tray loss can be provided by including a similar number of disk drives from each of trays 44, 46 and 48 by, for example, selecting them in a round-robin fashion as in the exemplary grouping shown in FIG. 5: Group A is defined by selecting a first disk drive 14 from tray 44, a second disk drive 24 from tray 46, a third disk drive 34 from tray 48, and, returning in a round-robin fashion to tray 44, selecting fourth disk drive 16 from tray 44, and a fifth disk drive 26 from tray 46; Group B is defined by, continuing to the next tray 48, selecting a first disk drive 36 from tray 48, a second disk drive 18 from tray 44, a third disk drive 28 from tray 46, a fourth disk drive 38 from tray 48, and a fifth disk drive 20 from tray 44; and continuing to tray 46, Group C is defined by selecting a first disk drive 30 from tray 46, a second disk drive 40 from tray 48, a third disk drive 22 from tray 44, a fourth disk drive 32 from tray 46, and a fifth disk drive 42 from tray 48. As noted above, Groups A, B and C can be defined at any suitable time, such as in response to receipt of an indication that a firmware download is to begin or, in other embodiments, prior to any such indication. Also, although in the exemplary embodiment three groups of five drives each are defined, in other embodiments there can be any other number of groups having any other number of drives.

The exemplary grouping described above with regard to FIG. 5 can be used in the method described above with regard to FIG. 4. In the following example using this grouping, the operation that renders the drive inaccessible is a firmware download of the type described above, and the mirrored data is configuration data of the type described above. A resulting sequence of operations is illustrated in FIG. 6.

Figure 6:
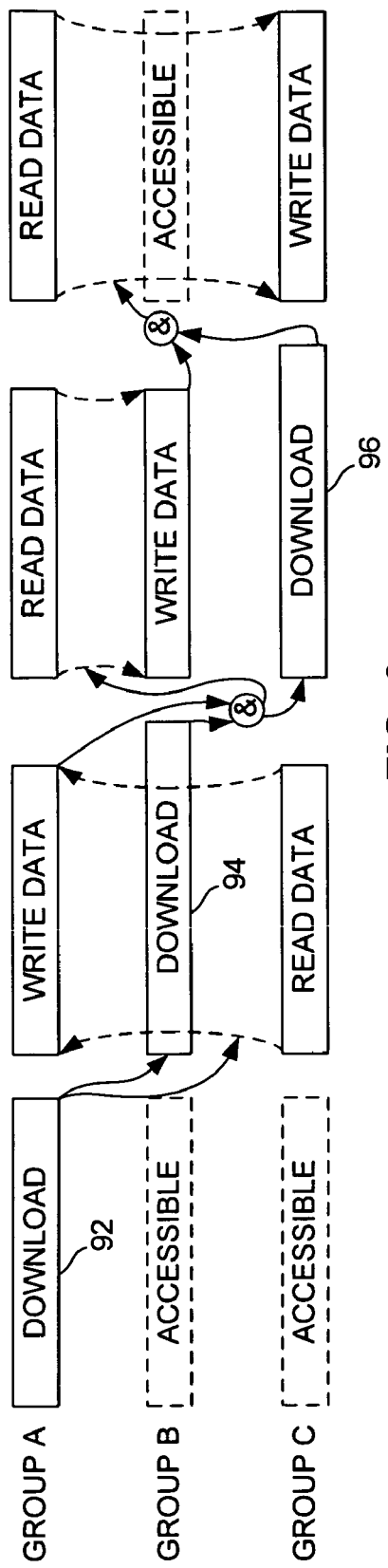
FIG. 6 is a sequence diagram, illustrating a sequence of operations in the storage array of FIG. 1 in accordance with the exemplary embodiment.
Figure 7:
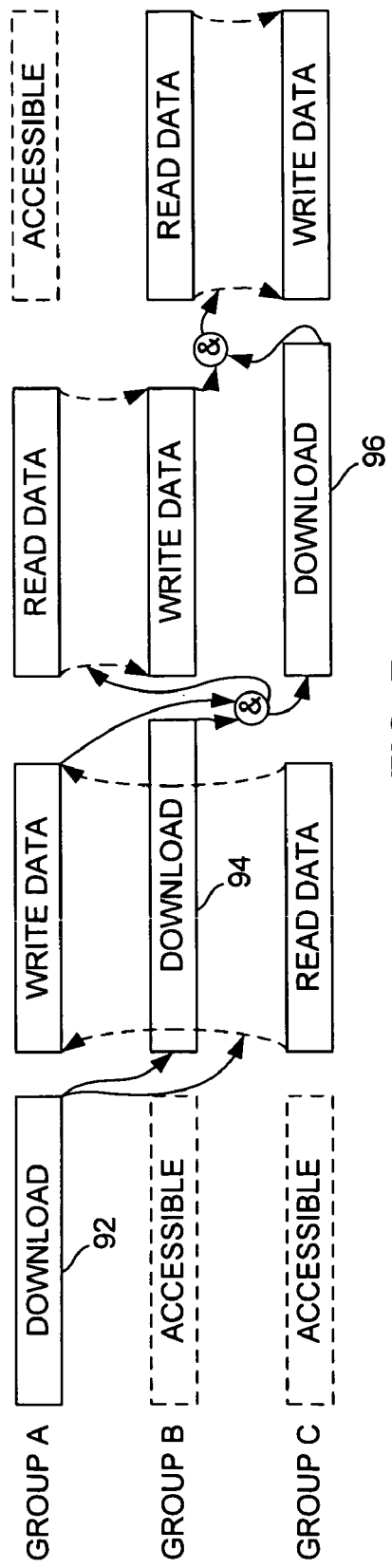
FIG. 7 is similar to FIG. 6, illustrating an alternative sequence of operations.

As illustrated in FIG. 6, a firmware download 92 can be initiated to the Group A drives, i.e., disk drives 14, 16, 24, 26 and 34, in the manner described above with regard to block 80 in FIG. 4. During the download, the Group A drives are inaccessible, i.e., read and write access is disabled, and the Group B and C drives are accessible. In response to a determination as described above with regard to block 82 in FIG. 4 that the download to the Group A drives has completed, a download 94 can be initiated to the Group B drives, i.e., disk drives 18, 20, 28, 36 and 38, in the manner described above with regard to block 84 in FIG. 4. (The initiation of an operation in response to another operation is indicated in FIGS. 6 and 7 by an arrow beginning at the end of one operation and pointing to the beginning of another operation.) At this time, i.e., in response to the determination that the download to the Group A drives has completed, or alternatively, after the download operation to the Group B drives has been initiated, a synchronization of data from the Group C drives to the Group A drives can be initiated in the manner described above with regard to block 86 in FIG. 4. (Synchronization is indicated in FIGS. 6 and 7 by a pair of curving broken-line arrows.) In response to a determination as described above with regard to block 88 in FIG. 4 that the synchronization has completed, and (as indicated by the ampersand "&" or "AND" operator in FIGS. 6 and 7) in response to a determination as described above with regard to block 82 that the download to Group B has completed, a download 96 can be initiated to the Group C drives, i.e., disk drives 22, 30, 32, 40 and 42, in the manner described above with regard to block 84 in FIG. 4. At this time, i.e., in response to the determination that the download to the Group B drives has completed and the synchronization of data from Group C to Group A has completed, or alternatively, after the download operation to the Group B drives has been initiated, a synchronization of data from the Group A drives to the Group C drives can be initiated in the manner described above with regard to block 86 in FIG. 4. Alternatively to a synchronization of data from the Group A drives to the Group C drives, a synchronization of data from the Group B drives to the Group C drives can be initiated, as indicated at the corresponding time in FIG. 7.

Once the code download or other operation has been performed upon all drive groups, storage array 10 can become available again to the host system for normal reading and writing of user data 68 (FIG. 3). The above-described method ensures that any changes to configuration data 70 (FIG. 3) in one or more drives that may have occurred during a firmware download to another drive are copied, i.e., synchronized, to the other drives.

In view of the descriptions above it should be apparent that so long as a drive is not undergoing the download or other such operation, the drive can participate in synchronization. The sequences and drive groups described above with regard to FIGS. 6 and 7 are intended only as examples, and in view of the descriptions herein, still others will occur readily to persons skilled in the art. The operation and synchronizations can be performed upon drive groups in any suitable sequence and in any suitable manner that promotes maximal accessibility of the mirrored data to storage array controller 12, the host, or other system that requires access to the mirrored data.

It should be noted that the invention has been described with reference to one or more exemplary embodiments for the purpose of demonstrating the principles and concepts of the invention. The invention is not limited to these embodiments. For example, although in the exemplary embodiment the mirrored data is configuration data, and the operation that can potentially cause loss of access to the mirrored data is a firmware download, in other embodiments the mirrored data can be any other suitable kind of data, and the operation can be any other suitable kind of operation. As will be understood by persons skilled in the art, in view of the description provided herein, many variations may be made to the embodiments described herein and all such variations are within the scope of the invention.

What is claimed is:

1. A method of operation for a storage array, the storage array having a plurality of storage devices on which is stored mirrored data, the method comprising:
   successively initiating an operation on each of a plurality of groups of storage devices, the operation initiated on a next group of storage devices of the plurality of groups of storage devices after completion of the operation on a previous group of storage devices of the plurality of groups of storage devices, each group of storage devices comprising at least one storage device, the operation disabling read and write access to the data stored in the storage devices of a group of storage devices between initiation and completion of the operation on the group of storage devices; and
   during the operation on a group of storage devices, initiating a data synchronization between two groups of storage devices other than the group of storage devices being operated upon.

2. The method claimed in claim 1, wherein the data synchronization is not initiated if another data synchronization has not yet completed.

3. The method claimed in claim 1, wherein the operation is a software download.

4. The method claimed in claim 1, wherein the data synchronization synchronizes configuration data between two groups of storage devices.

5. The method claimed in claim 1, wherein:
   the storage array comprises a plurality of trays, each tray having at least one storage device;
   a first group of storage devices comprises at least one storage device of a first tray and one storage device of a second tray;
   a second group of storage devices comprises at least one storage device of the first tray and one storage device of the second tray; and
   a third group of storage devices comprises at least one storage device of the first tray and one storage device of the second tray.

6. The method claimed in claim 5, wherein:
   the storage array comprises at least a first tray, a second tray and a third tray, each of the first, second and third trays having at least one of the storage devices; and
   at least one of the first, second and third groups of storage devices comprises at least one storage device of the first tray, at least one storage device of the second tray, and at least one storage device of the third tray.

7. The method claimed in claim 6, wherein:
   the first group of storage devices comprises at least one storage device of the first tray, at least one storage device of the second tray, and one storage device of the third tray;
   the second group of storage devices comprises at least one storage device of the first tray, at least one storage device of the second tray, and one storage device of the third tray; and
   the third group of storage devices comprises at least one storage device of the first tray, at least one storage device of the second tray, and one storage device of the third tray.

8. A storage array system, comprising:
   a plurality of storage devices; and
   a processor system programmed or configured to:
      successively initiate an operation on each of a plurality of groups of storage devices, the operation initiated on a next group of storage devices of the plurality of groups of storage devices after completion of the operation on a previous group of storage devices of the plurality of groups of storage devices, each group of storage devices comprising at least one storage device, the operation disabling read and write access to the data stored in the storage devices of a group of storage devices between initiation and completion of the operation on the group of storage devices; and
      during the operation on a group of storage devices, initiate a data synchronization between two groups of storage devices other than the group of storage devices being operated upon.

9. The system claimed in claim 8, wherein the data synchronization is not initiated if another data synchronization has not yet completed.

10. The system claimed in claim 8, wherein the operation is a software download.

11. The system claimed in claim 8, wherein:
   the storage array comprises a plurality of trays, each tray having at least one storage device;
   a first group of storage devices comprises at least one storage device of a first tray and one storage device of a second tray;
   a second group of storage devices comprises at least one storage device of the first tray and one storage device of the second tray; and
   a third group of storage devices comprises at least one storage device of the first tray and one storage device of the second tray.

12. The system claimed in claim 11, wherein:
   the storage array comprises at least a first tray, a second tray and a third tray, each of the first, second and third trays having at least one of the storage devices; and
   at least one of the first, second and third groups of storage devices comprises at least one storage device of the first tray, at least one storage device of the second tray, and at least one storage device of the third tray.

13. The system claimed in claim 12, wherein:
the first group of storage devices comprises at least one storage device of the first tray, at least one storage device of the second tray, and one storage device of the third tray;
the second group of storage devices comprises at least one storage device of the first tray, at least one storage device of the second tray, and one storage device of the third tray; and
the third group of storage devices comprises at least one storage device of the first tray, at least one storage device of the second tray, and one storage device of the third tray.

14. A computer program product for operating a storage array having a plurality of storage devices, the computer program product comprising a computer-readable medium on which is stored in computer-readable form code that when executed on the storage array causes the storage array to:
successively initiate an operation on each of a plurality of groups of storage devices, the operation initiated on a next group of storage devices of the plurality of groups of storage devices after completion of the operation on a previous group of storage devices of the plurality of groups of storage devices, each group of storage devices comprising at least one storage device, the operation disabling read and write access to the data stored in the storage devices of a group of storage devices between initiation and completion of the operation on the group of storage devices; and
during the operation on a group of storage devices, initiate a data synchronization between two groups of storage devices other than the group of storage devices being operated upon.

15. The computer program product claimed in claim 14, wherein the data synchronization is not initiated if another data synchronization has not yet completed.

16. The computer program product claimed in claim 14, wherein the operation is a software download.

17. The computer program product claimed in claim 14, wherein:
the storage array comprises a plurality of trays, each tray having at least one storage device;
a first group of storage devices comprises at least one storage device of a first tray and one storage device of a second tray;
a second group of storage devices comprises at least one storage device of the first tray and one storage device of the second tray; and
a third group of storage devices comprises at least one storage device of the first tray and one storage device of the second tray.

18. The computer program product claimed in claim 17, wherein:
the storage array comprises at least a first tray, a second tray and a third tray, each of the first, second and third trays having at least one of the storage devices; and
at least one of the first, second and third groups of storage devices comprises at least one storage device of the first tray, at least one storage device of the second tray, and at least one storage device of the third tray.

19. The computer program product claimed in claim 18, wherein:
the first group of storage devices comprises at least one storage device of the first tray, at least one storage device of the second tray, and one storage device of the third tray;
the second group of storage devices comprises at least one storage device of the first tray, at least one storage device of the second tray, and one storage device of the third tray; and
the third group of storage devices comprises at least one storage device of the first tray, at least one storage device of the second tray, and one storage device of the third tray.

* * * * *